Oct. 25, 1966 R. M. SCHMETTER 3,281,154

PHONOGRAPHS

Filed March 31, 1964

INVENTOR.
Ronald M. Schmetter
BY John J. Pederson
Atty.

United States Patent Office 3,281,154

Patented Oct. 25, 1966

3,281,154

PHONOGRAPHS

Ronald M. Schmetter, Chicago, Ill., assignor to Zenith Radio Corporation, Chicago, Ill., a corporation of Delaware Filed Mar. 31, 1964, Ser. No. 356,101

3 Claims. (Cl. 274—24)

This invention relates in general, to pick-up systems for phonographs, and more particularly to improvements for substantially reducing "howl" and "rumble" in high fidelity monophonic or stereo record reproducing systems.

Advances in the design of transducing elements have permitted the fabrication of highly sensitive pick-up systems for use in phonographs and the like. The acute sensitivity and delicate construction of such cartridges require that great care to be exercised to protect them from periodic vibration which may cause distortion of the reproduced signal, and also from sudden impacts which may damage the fragile stylus or transducing element. An excellent solution to the latter problem is the so-called floating cartridge. In accordance with one such design, discussed in more detail later herein, the cartridge is not rigidly affixed to the tone arm, but rather is pivotally mounted and adapted for restrained movement in a vertical plane. Thus, if the tone arm is accidentally dropped on the recording or the recording apparatus is jarred, the cartridge assembly, which is spring biased to its operating position, retracts into a recess in the tone arm leaving only a blunt portion of the tone arm to suffer the contact. Of course this not only protects the stylus and cartridge, but also the record from the injurious effects of such impulsive forces. Other aspects and advantages of a cartridge assembly constructed and mounted to the tone arm in this manner are more fully disclosed in Patent 3,074,726, which is assigned to the same assignee as the present invention.

Although a floating type construction affords excellent physical protection for the delicate cartridge assembly, the frequency response characteristics of the cartridge may still suffer from the effects of external periodic vibration. The present invention, therefore, is particularly concerned with phonograph apparatus employing floating cartridges and to the suppression or elimination of audio distortion caused from extrinsic vibratory forces therein.

A fundamental source of periodic vibration is the phonograph driving means, or motor, which produces a low frequency noise commonly termed "rumble." Rumble is transmitted to the tone arm via the motor mounting assembly and changer base plate and causes the tone arm to move in an undesirable oscillatory pattern. The resultant extraneous excursions of the tone arm relative to the pick-up stylus superimpose on the normal vibratory pattern of the stylus a vagrant oscillatory profile, the composite of these effects resulting in the generation of signals deviating from the desired response normally acquired from excitation of the stylus.

The efficiency of transmission of rumble from the driving means to the tone arm is usually low; however, the undesirable effect is often accentuated by resonant excitation of various components of the phonograph. For example, in a particular automatic record changer it has been determined that certain members in the changer resonate at the frequency of the imparted vibrations and serve to amplify the disturbance, and in addition, the tone arm and various components therein may resonate and serve to provide further amplification. It is also known that the audible "howl" ultimately produced is further emphasized by acoustic feedback from the loud speakers, being especially pronounced when the turntable and speakers are housed in the same enclosure.

In the past viscous damping has been employed at the pivot of the tone arm to reduce the coupling between the motor and the tone arm and thereby suppress the distortion. However, in modern phonographs operating with stylus tracking forces of two to three grams, any incumbrance of the free lateral movement of the tone arm is objectionable. In addition, with a floating cartridge it is considered of paramount importance to maintain substantially frictionless pivoting in the vertical plane in order to effect the proper vertical compliance.

Another method of alleviate the problem is to attack the source, that is, to employ a motor that had an inherently low noise output. Unfortunately, such motors are usually of a prohibitive cost for use in many competitive commercial phonographs.

Thus the essential requirements of free lateral movement of the tone arm and proper vertical compliance of the cartridge assembly combined with the high sensitivity of modern cartridges has resulted in a pick-up system that is quite susceptible to extrinsic vibration, and yet which precludes the use of many prior methods for alleviating this problem.

It is therefore an object of the present invention to provide an improved means for suppressing or eliminating the deleterious effects of periodic external vibration on the pick-up system of a phonograph.

It is a further object of this invention to provide a simple and economical method for substantially eliminating the undesirable results of motor noise on the frequency response characteristic of a floating cartridge.

It is still a further object of this invention to provide means for suppressing external periodic vibrations without interfering with the required free lateral movement of the tone arm or vertical compliance of the cartridge.

In accordance with the invention, a phonograph having driving means producing an inherent low frequency rumble comprises reproducing means including a cartridge assembly adapted for vertical pivoting about a predetermined horizontal axis and provided with a record engaging stylus, the assembly having a mounting shaft and including a transducer responsive to the relative movement of the stylus for deriving an audio signal substantially proportional to the excursions of the stylus. Also included is a tone arm having spaced horizontally opposed body portions, and which tone arm is subject to extraneous movement as a result of the rumble causing an extraneous "howl" to be superimposed on the audio signal. Elastomeric means are interposed between the shaft and the body portions are of a consistency of sufficient stiffness for stably supporting the shaft for pivotal movement with respect to the body portions about the predetermined axis and further of a consistency for substantially damping the extraneous tone arm movement to effectively isolate the cartridge assembly from the tone arm and substantially eliminate the "howl."

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
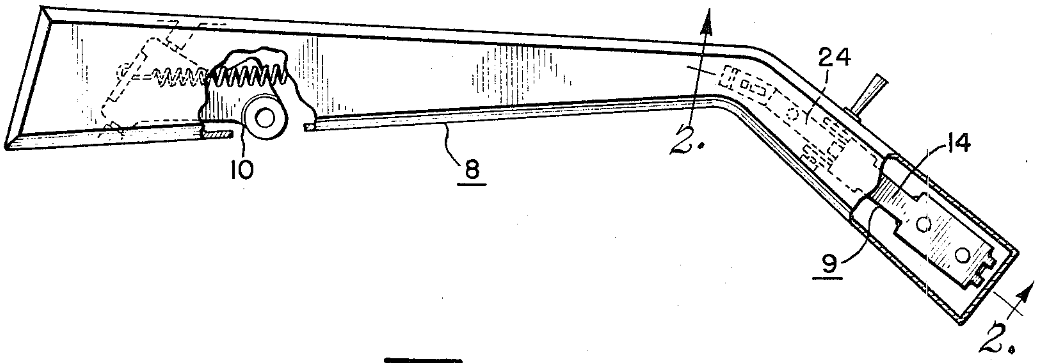
FIGURE 1 is a top plan view of a phonograph tone arm embodying the present invention.

Referring now specifically to FIGURE 1, there is shown an illustrative tone arm and cartridge assembly, which embodies features of the present invention and which includes an elongated tone arm shown generally at 8 and having a cartridge assembly 9 mounted thereto. Provision is made at 10 for pivotally mounting tone arm 8 for horizontal movement about a vertical axis defined by a tone arm pivot post, not shown. The phonograph is also not illustrated but is of generally known construction and may either comprise a turntable or an automatic changer.

Figure 2:
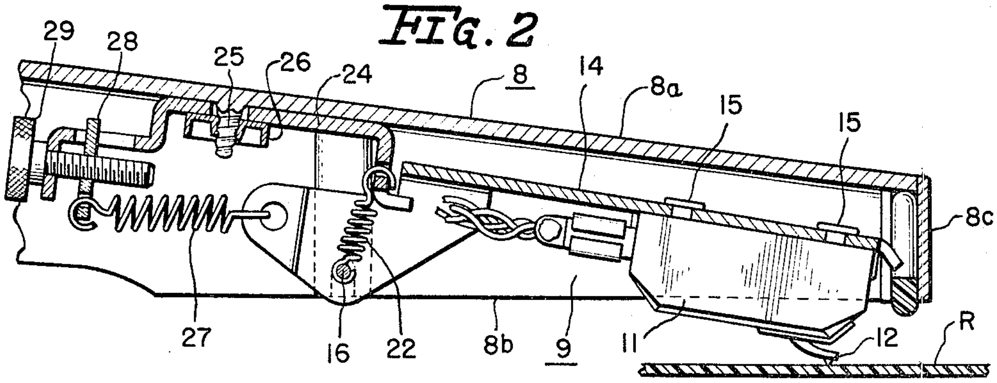
FIGURE 2 is a sectional view taken substantially along the line 2—2 of FIGURE 1 showing in greater detail a portion of a tone arm and cartridge assembly adaptable for use in accordance with the present invention, and which assembly is illustrated tracking a sound recording.
Figure 3:
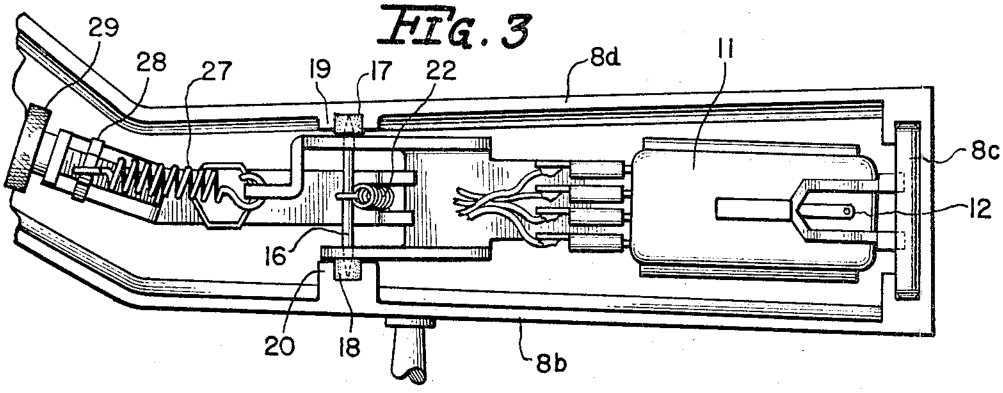
FIGURE 3 is a bottom plan view of the tone arm of FIGURE 1 illustrating the cartridge assembly pivotally mounted to a tone arm in accordance with the present invention.

In FIGURE 2, the forward portion of the tone arm 8 is shown having a relatively flat top wall 8*a*, a depending rear sidewall 8*b*, a front wall 8*c* and a front side wall 8*d*, shown with clarity in FIGURE 3, cooperating to form an enclosure for the cartridge assembly 9. The cartridge assembly 9 comprises a cartridge 11 housing a transducer responsive to the relative movement of a stylus 12 for ultimately deriving an audio signal substantially proportional to the excursions of the stylus 12. It is understood that other types of cartridges may be employed in the present assembly; the particular size, shape, response characteristics, being delineated by factors independent of the requirements of this invention. The cartridge assembly 9 also includes a rocker bracket 14 which is secured to cartridge 11, as by rivets 15. The rear portion of bracket 14 includes a mounting shaft 16 disposed along a predetermined horizontal axis and adapted for pivotally mounting the cartridge assembly 9 between the spaced horizontally opposed wall or body portions 8*b* and 8*d* of tone arm 8. Specifically, as is shown more clearly in FIGURE 3, mounting shaft 16 is adapted to be journalled in a manner to be described into respective bearings 19 and 20 located on the horizontally opposed wall portions 8*d* and 8*b*. A spring 22 couples shaft 16 to a bracket 24 and is provided for securely retaining shaft 16 within slot bearings 19 and 20. Bracket 24 is fastened to the upper wall 8*a* of tone arm 8 by a screw 25, integral with tone arm 8, and a nut 26. A spring 27 is coupled between the back portion of bracket 14 and a movable member 28. As illustrated, a screw 29 threaded through bracket 24 and member 28 cooperate to provide for adjusting the tension on spring 27. It will be appreciated that the pivotally mounted cartridge assembly 9 tends to seek an equilibrium condition when tracking the record R, and that this equilibrium position may be adjusted by varying the tension of spring 27.

Figure 4:
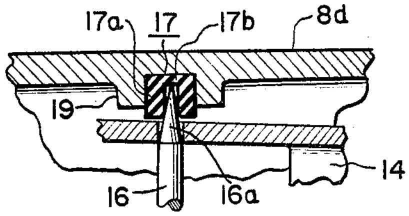
FIGURE 4 is an exploded fragmentary view depicting in detail the unique structural arrangement of a preferred embodiment of the novel vibration damping means of the invention.

In accordance with the invention, resilient mounting means 17, 18 of rubber or the like are provided for pivotally mounting cartridge assembly 9 to tone arm 8 and substantially eliminating audible "howl." With reference to FIGURE 4, resilient mounting member 17 is of a cylindrical shape having side wall portions 17*a* which are preferably of a thickness approximately four times the thickness of the base portion 17*b*. Illustrative dimensions, which have been found to achieve the benefits of the invention in practice, are 0.020 and 0.005 inch for the wall and base portions, respectively. As illustrated, mounting shaft 16 which is journalled within resilient member 17 is fabricated with a narrowing or tapered end portion 16*a* for permitting contact only along a relatively small surface area principally on wall portions 17*a* of member 17. This pointed design of shaft 16 tends to minimize friction between mounting members 17, 18 and shaft 16. Minimal pivotal friction is, of course, necessary to effect the proper vertical compliance of a floating cartridge and it has been found that the inventive design minimizes friction consistent with proper pivotal support. It is understood that the opposite end of shaft 16 is similar in form and construction and is similarly supported in resilient member 18.

A second and complementary aspect of the design relates to the material and configuration of members 17 and 18 which are preferably of a number 40 durometer rubber, sufficiently firm to provide rigidity to the pivot yet pliable enough to readily twist under a shear force. This allows the inner wall portions of members 17 and 18 to rotate somewhat with the rotation of shaft 16 creating a shear force distribution between the inner and outer walls of the cups. Hence rotation of the cartridge assembly from a nominal operating position may result in a partial rotation of the shaft 16 in the resilient members 17 and 18 and additionally a twisting of these members. It has been found that this twisting action provides a small restoring torque which tends to suppress any resonant "bobbing" of the cartridge assembly 9. Since damping is not provided at pivot 10, the horizontal movement of the tone arm is not impaired and in accordance with the invention substantial suppression of disturbing vibratory forces is achieved while actually enhancing the vertical compliance of the cartridge assembly. In practice it has been found that the novel construction of the present invention affords as much as a 50% reduction in audible "howl."

Moreover, the novel pivoting means herein employed serves to effectively decouple the cartridge and tone arm and dull the natural sympathetic resonances of the stylus and tone arm. Judicious design of the tone arm assembly results in a tone arm stylus resonance below the audio range; however, associated mechanical instability of the arm present during such resonance may be effectively reduced by employing the construction of the invention.

Thus the invention provides means for substantially eliminating the adverse effects of rumble and other periodic disturbances on the audio response characteristics of a floating cartridge while enhancing the vertical compliance of the cartridge assembly. The marked attenuation in audio distortion or "howl" thus achieved is even more remarkable when it is realized that the structural modification required to accomplish this much sought after result is simple, inexpensive and readily adaptable to existing floating cartridge tone arm constructions.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a phonograph having driving means producing an inherent low frequency rumble, the combination comprising:

reproducing means comprising a cartridge assembly adapted for vertical pivoting about a predetermined horizontal axis and provided with a record-engaging stylus, said assembly having a mounting shaft and including a transducer responsive to the relative movement of said stylus for deriving an audio signal substantially proportional to the excursions of said stylus;

a tone arm having spaced horizontally opposed body portions, which tone arm is subject to extraneous movement as a result of said rumble causing an extraneous "howl" to be superimposed on said audio signal;

and elastomeric means interposed between said shaft and said body portions and having a consistency of sufficient stiffness for stably supporting said shaft for pivotal movement with respect to said body portions about said predetermined axis and further of a consistency for substantially damping said extraneous tone arm movement to effectively isolate said cartridge assembly from said tone arm and substantially eliminate said "howl."

2. In a phonograph having driving means producing an inherent low frequency rumble, the combination comprising:

reproducing means comprising a cartridge assembly adapted for vertical pivoting about a predetermined horizontal axis and provided with a record engaging stylus, said assembly having a mounting shaft with conically tapered end portions and including a transducer responsive to the relative movement of said stylus for deriving an audio signal substantially proportional to the excursions of said stylus;

a tone arm having spaced horizontally opposed body portions each provided with rigid bearing housings therein and which tone arm is subject to undesirable oscillatory movement as a result of said rumble causing an extraneous "howl" to be superimposed on said audio signal;

and means comprising a pair of cup-shaped mounting means each composed of an elastomeric material and each having an open end receiving a respective one of said conically tapered end portions of said shaft with said conically tapered end portions contacting said cup-shaped means only along a relatively small surface area to mediately journal said shaft in said rigid bearing housings while minimizing pivotal friction, said cup-shaped means further having a consistency of sufficient stiffness for stably supporting said shaft for pivotal movement with respect to said body portions about said predetermined axis and of a consistency for substantially damping said extraneous tone arm movement to effectively isolate said cartridge assembly from said tone arm and substantially eliminate said "howl."

3. In a phonograph having driving means producing an inherent low frequency rumble, the combination comprising:

reproducing means comprising a cartridge assembly adapted for vertical pivoting about a predetermined horizontal axis and provided with a record engaging stylus, said assembly having a mounting shaft with conically tapered end portions and including a transducer responsive to the relative movement of said stylus for deriving an audio signal substantially proportional to the excursions of said stylus;

a tone arm having spaced horizontally opposed body portions each provided with rigid bearing housings therein and which tone arm is subject to undesirable oscillatory movement as a result of said rumble causing an extraneous "howl" to be superimposed on said audio signal;

and a pair of cup-shaped mounting means each of the consistency of approximately number 40 durometer rubber and each having a cylindrical wall portion and a transverse base portion substantially thinner than said wall portion and an open end receiving a respective one of said conically tapered end portions of said shaft with said conically tapered end portions contacting said cup-shaped means only along a relatively small surface area to mediately journal said shaft in said rigid bearing housings for supporting said shaft with sufficient stiffness to permit stable pivoting of said shaft with respect to said body portions about said predetermined axis and for damping said extraneous tone arm movement to effectively isolate said cartridge assembly from said tone arm and substantially eliminate said "howl."

References Cited by the Examiner

UNITED STATES PATENTS

| | | | |
|---|---|---|---|
| 2,464,064 | 3/1949 | Thompson | 274—24 |
| 2,572,495 | 10/1951 | Forest | 274—24 X |
| 2,676,806 | 4/1954 | Bachman | 274—23 |
| 3,074,726 | 1/1963 | Sioles et al. | 274—23 |
| 3,173,692 | 3/1965 | Antwerp | 274—23 |

NORTON ANSHER, *Primary Examiner.*

C. B. PRICE, *Assistant Examiner.*